June 7, 1927.

A. S. NEWMARK 1,631,500

POWER TRANSMISSION DEVICE

Filed Dec. 16, 1925

WITNESSES

INVENTOR
Aaron S. Newmark
BY
ATTORNEYS

Patented June 7, 1927.

1,631,500

UNITED STATES PATENT OFFICE.

AARON S. NEWMARK, OF BROOKLYN, NEW YORK.

POWER-TRANSMISSION DEVICE.

Application filed December 16, 1925. Serial No. 75,836.

This invention relates to power transmission devices and refers more particularly to a device of this character designed as an attachment to an automobile motor equipped with a fan belt from which the power is transmitted to a rotary polishing head or any other suitable implement.

The principal object of the present invention resides in the provision of a simple, inexpensive and efficient means for transmitting power from the fan belt of an automobile motor, and comprehends in connection therewith an adjustable means for supporting the transmision device in correlation to the fan belt to obtain the maximum efficiency therefrom.

The invention furthermore comprehends a power transmision device which is readily associated with or removed from the automobile, and necessitates no alteration or changes of construction in the parts to which it is applied.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings:—

Figure 1:
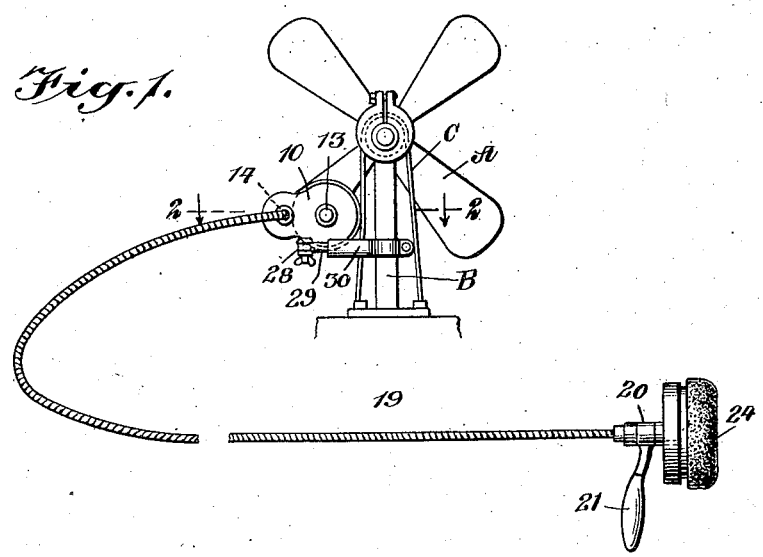
Figure 1 is a face view of the fan unit with the power transmission attachment in applied relation.
Figure 2:
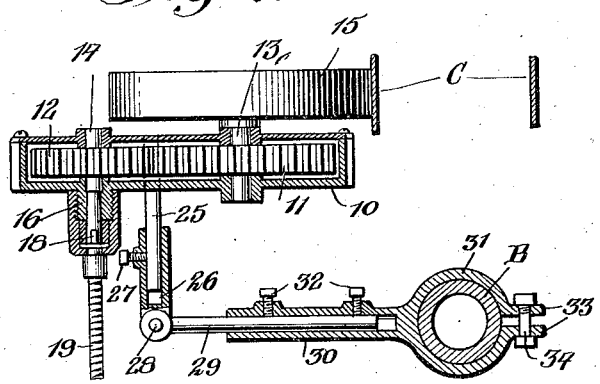
Fig. 2 is a horizontal sectional view therethrough on an enlarged scale taken approximately on the line indicated at 2—2 in Fig. 1.
Figure 3:
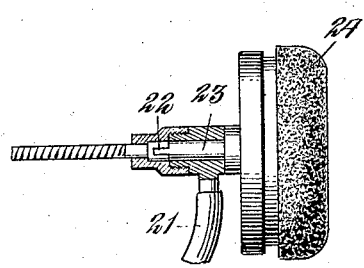
Fig. 3 is a sectional view on an enlarged scale of the polishing head or other implement driven by means of the power transmission device.

Referring to the drawings by characters of reference, A designates a motor fan, B the fan-bearing bracket, and C the fan belt which drives the fan.

The power transmission device constituting the present invention, consists of a housing or casing 10 in which a pair of meshing gears 11 and 12 are mounted on transverse shafts 13 and 14, the former extending through the casing 10 in one direction and having secured thereto a drive pulley 15 which is designed to be positioned in engagement with one of the leads of the fan belt C for transmitting power from the fan belt through the pulley to the meshing gears 11 and 12. The shaft 14 of the gear 12 extends through a threaded nipple 16 on the opposite side of the casing and is formed at its outer end with a coupling 18, one end of which is connected with a flexible shaft indicated generally by the reference character 19 leading into a terminal member 20 provided with a handle 21. The opposite end of the flanged shaft is provided with a coupling 22 for receiving the terminal of the shank 23 of a polishing head or other implement 24 to which the power is designed to be transmitted. In order to provide means for supporting the power transmission device in juxtaposition and proper correlation with the fan belt C, a supporting bracket is provided, which consists of a stem 25 projecting from the casing or housing 10, over which a tubular arm 26 is telescopically arranged and adjustable, the stem and arm being maintained in relatively adjusted relation by a set screw 27. The arm 26 is pivotally connected at 28, with a stem 29 which is received by the tubular shank 30 of a clamping element 31, said shank and stem being maintained in relatively adjusted relation by set screws 32. The clamping element 31 is in the nature of a split ring having outwardly projecting apertured projecting ears 33 with which a bolt 34 is associated for clamping the supporting bracket to the motor fan bearing bracket B. By constructing the supporting bracket to permit of substantial universal adjustments, it is obvious that the device can be arranged to operate in conjunction with practically any standard form of motor fan belt now in use. When the device is applied, it is obvious that the fan belt engaging with the periphery of the drive pulley 15, will, through the intermeshing gears 11 and 12, rotate the flexible shaft and any implement which is coupled with the outer end thereof.

While the device is illustrated particularly as a means for driving a polishing head which will be employed for polishing the body or other part of the automobile, it is, nevertheless, intended within the scope of the invention, to attach thereto any form of implement desired.

What is claimed is:

1. A power transmission attachment of the class described, including a fan belt engaging pulley, a flexible shaft driven thereby, and means for supporting the pulley in operative relation to the fan belt, said means consisting of a member to which the pulley is journaled, an adjustable clamping bracket comprising hingedly connected arms each having telescopically associated sections, one of which sections is attached to said member and the other of which is designed to be clamped to a stationary element adjacent the fan belt.

2. A power transmission attachment of the class described, including a fan belt engaging pulley, a flexible shaft driven thereby, and means for supporting the pulley in operative relation to the fan belt, said means consisting of a member to which the pulley is journaled, an adjustable clamping bracket comprising hingedly connected arms each having telescopically and rotatably associated sections, one of which is attached to said member and the other of which is designed to be clamped to a stationary element adjacent the fan belt.

3. An automobile accessory, comprising a fan belt power transmission device including a casing having intermeshing gears, shafts for said gears journaled in the casing and projecting from the opposite sides thereof, a drive pulley secured to one of said shafts and arranged exteriorly of the casing for engagement with one of the leads of a fan belt, a flexible shaft connected with the remaining gear shaft and provided at its free end with a coupling adapted to receive the shank of an implement.

4. An automobile accessory, comprising a fan belt power transmission device including a casing having intermeshing gears, shafts for said gears journaled in the casing and projecting from the opposite sides thereof, a drive pulley secured to one of said shafts and arranged exteriorly of the casing for engagement with one of the leads of the fan belt, a flexible shaft connected with the remaining gear shaft provided at its free end with a coupling adapted to receive the shank of an implement, and means for supporting the casing and maintaining the drive pulley in operative correlation with the fan belt, comprising an adjustable supporting bracket.

5. An automobile accessory, comprising a fan belt power transmission device including a casing having intermeshing gears, shafts for said gears journaled in the casing and projecting from the opposite sides thereof, a drive pulley secured to one of said shafts and arranged exteriorly of the casing for engagement with one of the leads of the fan belt, a flexible shaft connected with the remaining gear shaft provided at its free end with a coupling adapted to receive the shank of an implement, and means for supporting the casing and maintaining the drive pulley in operative correlation with the fan belt, comprising an adjustable supporting bracket consisting of pivotally connected arms having telescopically associated sections, one of which is connected to the casing and the other of which is provided with a clamping device.

AARON S. NEWMARK.